(12) United States Patent
Voigt

(10) Patent No.: US 12,330,651 B2
(45) Date of Patent: Jun. 17, 2025

(54) METHOD FOR OPERATING A DRIVING ASSISTANT FOR AUTOMATED LATERAL GUIDANCE

(71) Applicant: Robert Bosch GmbH, Stuttgart (DE)

(72) Inventor: Yixuan Voigt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 210 days.

(21) Appl. No.: 17/934,921

(22) Filed: Sep. 23, 2022

(65) Prior Publication Data

US 2023/0098344 A1 Mar. 30, 2023

(30) Foreign Application Priority Data

Sep. 30, 2021 (DE) ..................... 10 2021 210 964.0

(51) Int. Cl.
| | |
|---|---|
| *B60W 30/18* | (2012.01) |
| *B60W 30/09* | (2012.01) |
| *B60W 40/04* | (2006.01) |
| *B60W 50/14* | (2020.01) |

(52) U.S. Cl.
CPC ...... *B60W 30/18163* (2013.01); *B60W 30/09* (2013.01); *B60W 40/04* (2013.01); *B60W 50/14* (2013.01); *B60W 2050/143* (2013.01); *B60W 2050/146* (2013.01); *B60W 2554/80* (2020.02)

(58) Field of Classification Search
None
See application file for complete search history.

(56) References Cited

U.S. PATENT DOCUMENTS

| | | | | |
|---|---|---|---|---|
| 5,521,579 | A * | 5/1996 | Bernhard | B60W 30/18163 340/438 |
| 2005/0228588 | A1* | 10/2005 | Braeuchle | B60W 50/0097 701/301 |
| 2015/0360684 | A1* | 12/2015 | Matsuno | B60W 30/18163 701/23 |
| 2017/0129501 | A1* | 5/2017 | Lee | B60W 30/16 |
| 2017/0240184 | A1* | 8/2017 | Kluever | B60W 30/09 |
| 2017/0334460 | A1* | 11/2017 | Arakawa | B60W 30/18163 |
| 2018/0105185 | A1* | 4/2018 | Watanabe | B60W 50/14 |
| 2018/0370527 | A1* | 12/2018 | Rachor | B60Q 9/008 |
| 2019/0054922 | A1* | 2/2019 | Yalla | B60W 10/20 |
| 2021/0197824 | A1* | 7/2021 | Kim | G06V 20/588 |
| 2022/0234587 | A1* | 7/2022 | Munning | G08G 1/096791 |

FOREIGN PATENT DOCUMENTS

DE       102005023185 A1    11/2006

\* cited by examiner

*Primary Examiner* — Daniel L Greene
(74) *Attorney, Agent, or Firm* — NORTON ROSE FULBRIGHT US LLP

(57) ABSTRACT

A method for operating a driving assistant for the automated lateral guidance of a motor vehicle. The method includes: carrying out an automated lane guidance of the motor vehicle in a first lane; ascertaining, by the motor vehicle, an obstacle situation of a further motor vehicle in the first lane; carrying out a lane release with the aid of an automated lane change of the motor vehicle into a second lane; ascertaining a lane return situation with regard to the motor vehicle; deciding on the lane return into the first lane, taking the lane return situation into account; carrying out a decided lane return into the first lane with the aid of an automated lane change; continuing the automated lane guidance of the motor vehicle in the first lane. A device for carrying out the method is also described.

13 Claims, 5 Drawing Sheets

METHOD FOR OPERATING A DRIVING ASSISTANT FOR AUTOMATED LATERAL GUIDANCE

CROSS REFERENCE

The present application claims the benefit under 35 U.S.C. § 119 of German Patent Application No. DE 10 2021 210 964.0 filed on Sep. 30, 2021, which is expressly incorporated herein by reference in its entirety.

The present invention relates to a method for operating a driving assistant for the automated lateral guidance of a motor vehicle. According to an example embodiment of the present invention, the method includes the following method steps: carrying out an automated lane guidance of the motor vehicle in a first lane; ascertaining, by the motor vehicle, an obstacle situation of a further motor vehicle in the first lane; carrying out a lane release with the aid of an automated lane change of the motor vehicle into a second lane; ascertaining a lane return situation with regard to the motor vehicle; deciding on the lane return into the first lane, taking the lane return situation into account; carrying out a decided lane return into the first lane with the aid of an automated lane change; continuing the automated lane guidance of the motor vehicle in the first lane. Moreover, the present invention relates to a device for carrying out the method.

BACKGROUND INFORMATION

Lane change assistants are available in the related art. When the driver indicates the intention to make a lane change, for example by setting the blinker or via a steering maneuver, the lane change assistant generates, as a function of the ascertained hazard value, a warning signal, for example in the form of an acoustic signal or in the form of a visual display on the instrument panel or in the left outside mirror. German Patent Application No. DE 10 2005 023 185 A1, for example, describes a lane change assistant for motor vehicles, including a monitoring device for monitoring the traffic ahead of and behind the ego-vehicle, and a decision device for deciding whether a safe lane change is possible.

In addition, automated longitudinal controls, also referred to as adaptive cruise control (ACC), are/is available in the related art. With an ACC, for example the speed of the motor vehicle is adapted to a maximum speed or to the traffic. The transverse control is taken over by the driver in this case.

Automated transverse guidance in the form of following a course of the lane allows, for example, a so-called lane-centering assistant. In contrast, a so-called highway assist may automatedly take over the automatic longitudinal control, and to a certain extent, also the transverse control, in order to follow the course of the lane on an expressway. Research has also been conducted on approaches to the complete takeover of the driving task and fully automated, autonomous driving (so-called Level 5).

SUMMARY

A method and a device according to the present invention may advantageously enable a lane release as needed. Safe (semi-) automated guiding of a motor vehicle on multilane roadways is thus made possible. In particular, the risk of rear-end collisions is reduced. In addition, this results in optimal utilization of the available roadway resources and reduction of backups of faster-moving following vehicles due to avoidance of a blocked lane. Likewise, due to the described (semi-)automated guidance of the motor vehicle according to the present invention, "human" behavior is simulated, since not unnecessarily hindering other road users is regarded to be a general consensus and generally worthwhile. The additional functionality thus results in increased acceptance by the user of (semi-)automated driving. In turn, this results in more frequent use, and thus, providing more relief to the driver and reducing the likelihood of accidents.

This is made possible according to the present invention by the features disclosed herein. Example embodiments of the present invention are disclosed herein.

According to an example embodiment of the present invention, a method for operating a driving assistant for the automated lateral guidance of a motor vehicle includes the method steps: carrying out an automated lane guidance of the motor vehicle in a first lane; ascertaining, by the motor vehicle, an obstacle situation of a further motor vehicle in the first lane; carrying out a lane release with the aid of an automated lane change of the motor vehicle into a second lane; ascertaining a lane return situation with regard to the motor vehicle; deciding on the lane return into the first lane, taking the lane return situation into account; carrying out a decided lane return into the first lane with the aid of an automated lane change; continuing the automated lane guidance of the motor vehicle in the first lane.

A driving assistance function is understood to mean a function that enables (semi-)automated driving. The driving assistance function assists the driver of an ego-vehicle with the aid of automated lane guidance, and expands this driver support by recognizing and carrying out a lane release as needed. For this purpose, the driving situation of the motor vehicle is analyzed and assessed.

For example, video data and/or radar data concerning the vehicle surroundings may be ascertained for this purpose. It is analyzed whether an obstacle situation is present in which the ego-vehicle hinders the further traffic. This means, for example, that the traffic situation of the motor vehicle present at that time is ascertained, taking into account at least one piece of information of a surroundings detection system, such as a camera, of the motor vehicle, at least one piece of information of a road user in the present lane of the motor vehicle to the rear with respect to the motor vehicle being taken into account. Alternatively or additionally, a car-to-car communication and/or a car-to-infrastructure communication may be used to obtain information concerning an obstacle situation, or to ascertain an obstacle situation, taking this information into account.

An obstacle situation as such is recognized when it corresponds to a defined characteristic. This is the case, for example, when the motor vehicle represents an obstacle to a further motor vehicle directly following the motor vehicle in the same lane, a threshold value for at least one defined variable being taken into account for ascertaining the obstacle. The following are examples of a defined variable that may be used: a distance between the motor vehicle and the following further motor vehicle; and/or a speed difference between the motor vehicle and the following further motor vehicle (i.e., relative speed) and/or an acceleration difference between the motor vehicle and the following further motor vehicle (i.e., relative acceleration). Relative speed or relative acceleration is understood in particular to mean a variable that may decrease the distance between the ego-vehicle and the following traffic over time. For example, a decision for the automated lane release takes place when the distance of a following automobile from the ego-vehicle falls below a set minimum distance.

According to an example embodiment of the present invention, a decision for the automatic lane release takes place in particular when the obstacle situation corresponds to a defined characteristic. For example, a lane release takes place when the actual or expected obstacle to the traffic to the rear, caused by the motor vehicle, has a defined relevance, for example. In this case, a lane change from the present lane into another lane takes place to resolve the obstacle situation or avoid an imminent obstacle situation. The threshold value (or the threshold values) is/are advantageously settable, for example manually by the driver or by selecting a specific function (for example, sport driving mode, comfort driving mode, etc.).

Both lanes are to be understood as running in the same travel direction. The method is therefore advantageously used for roadways with multiple lanes in one direction. In addition, the second lane is advantageously directly adjacent to the first lane, so that a change over multiple lanes does not have to be assessed. This further increases the validity of the results, and thus, the safety of the (semi-)automated driving function. Furthermore, the lane release advantageously takes place via a change into a lane with a slower control speed, i.e., "to the right" for right-hand traffic or "to the left" for left-hand traffic.

According to an example embodiment of the present invention, in addition, a decision for the lane return into the first lane, taking an ascertained lane return situation into account, is provided. For this purpose, for example video data and/or radar data concerning the vehicle surroundings may be re-ascertained. It is analyzed, for example, whether a return into the original lane is possible. It is ascertained, for example, whether a sufficient gap in the traffic flow in the original lane is present, so that the ego-vehicle could return into this lane. In addition, it is advantageously assessed whether, for a potential return into the original lane, the ego-vehicle would re-trigger an obstacle situation in this lane. If the criteria that are stored for a lane return are met, a positive decision for the lane return is made. Carrying out a decided lane return into the first lane takes place anew with the aid of an automated lane change operation. After the automated lane change is carried out, the automated lane guidance of the motor vehicle is continued in the first lane.

In one advantageous embodiment of the present invention, the method is characterized in that the lane return situation is ascertained when at least one of the following conditions is met: a non-obstacle situation of a further motor vehicle in the first lane is ascertained by the motor vehicle for a potential lane return of the motor vehicle into the first lane; a traffic gap in the first lane that is sufficient for a potential lane return of the motor vehicle is ascertained; a restriction of a movement option of the motor vehicle in the second lane is ascertained.

This is understood to mean that a specific traffic situation must be present as a condition for a lane return. As a criterion it may be defined, for example, that a restriction of the movement option of the ego-vehicle, in particular with regard to its planned driving profile, is ascertained. Such a restriction may result, for example, from the preceding vehicle in the same lane initiating a brake application. The ego-vehicle would likewise have to reduce its speed in order to adhere to the required safety distance. Its movement option would thus be restricted.

In addition, according to an example embodiment of the present invention, as a condition it may be defined that a sufficient gap in the traffic to the rear (with respect to the ego-vehicle) in the target lane of the lane return is recognized. If the ego-vehicle is traveling in the right lane of a three-lane roadway, in particular the traffic to the rear in the middle lane of the three-lane roadway would be analyzed, since the middle lane represents the target lane of the lane return. If there is a sufficient distance from the next following vehicle, a lane return may be initiated.

Furthermore, according to an example embodiment of the present invention, as a condition it may be defined that no new obstacle situation in the target lane of the lane return is allowed to result due to the lane return. With regard to the characterization of an obstacle situation, reference is made to the above discussion. Such a situation may result, for example, when, although sufficient distance from the following vehicle is present for a safe lane return, the speed difference between the lane-changing ego-vehicle and the following vehicle in the target lane of the lane change is so pronounced that within a short time the distance is expected to fall below the required safety distance, and therefore the following vehicle must initiate a safety braking operation, which soon results in an obstacle during or after a lane return.

In one possible embodiment of the present invention, the method includes that the non-obstacle situation of a further motor vehicle in the first lane is ascertained by the motor vehicle for a potential lane return of the motor vehicle into the first lane when at least one of the following conditions is met: in the rear field of the motor vehicle in the second lane, no further motor vehicle is ascertained in the first lane; a distance between the motor vehicle in the second lane and a following motor vehicle in the first lane is greater than a defined threshold value; a speed difference between the motor vehicle in the second lane and a following motor vehicle in the first lane is less than a defined threshold value; an acceleration difference between the motor vehicle in the second lane and a following motor vehicle in the first lane is less than a defined threshold value.

In one preferred embodiment of the present invention, the method includes that the restriction of a movement option of the motor vehicle in the second lane is ascertained when at least one of the following conditions is met: a distance between the motor vehicle in the second lane and a preceding motor vehicle in the second lane is less than a defined threshold value; a speed difference between the motor vehicle in the second lane and a preceding motor vehicle in the second lane is greater than a defined threshold value; an acceleration difference between the motor vehicle in the second lane and a preceding motor vehicle in the second lane is less than a defined threshold value.

In one alternative refinement of the present invention, the method includes the following method steps: ascertaining a lane return option situation with regard to the motor vehicle in the first lane; deciding to release the first lane by the motor vehicle, taking the lane return option situation into account.

This is understood to mean that the options for a subsequent return into the same lane are analyzed prior to a decision to release a present lane. For this purpose, for example the present driving situation is ascertained, and on this basis it is ascertained how a future driving situation could be represented. For this purpose, an extrapolation of ascertained driving profiles (for example, positions, speeds, accelerations, movement patterns) of other road users may be made in a simple manner.

Since extrapolations (in particular for accelerations, for example) beginning with a certain timeframe may result in a deviation from realistic assumptions, in one alternative embodiment an unchanged continuation of ascertained driving profiles (in particular, maintaining the present speeds) may also be taken into account.

Of course, more complex scenarios may also be created for representing possible future traffic situations. For taking into account the uncertainty for an actual future occurrence, for example probabilities may be used. Information or data concerning the course of the roadway may also be taken into account in ascertaining the future driving situation.

In one advantageous embodiment of the present invention, the method is characterized in that the lane return option situation with regard to the motor vehicle in the first lane is ascertained when at least one of the following conditions is met: a lane return of the motor vehicle from the second lane back into the first lane is possible, in particular within a defined distance; a change of the motor vehicle into the second lane does not result in a restriction of a movement option of the motor vehicle, in particular not within a defined distance.

This is understood to mean that a positive assessment of the option for a lane return is made, for example, when it is ascertained that a lane return within a defined distance is assumed to be likely possible, without the ego-vehicle thereby having to reduce its planned speed, for example. As stated above, for this purpose a simple continuation of the present driving situation or a complex scenario creation may be used.

In one possible embodiment of the present invention, the method is characterized in that the lane return option situation is taken into account as a prerequisite for the decision for the lane release, in particular that a negative decision for the lane release is made when a lane return option situation is not ascertained. This is understood to mean that no lane release takes place when it is already ascertained beforehand that a lane return will no longer be possible, for example within a defined driving time or distance.

In one preferred refinement of the present invention, the method is characterized by the method steps: ascertaining a lane release option situation; deciding to release the first lane by the motor vehicle, taking the lane release option situation into account.

This is understood to mean that surroundings data are ascertained, and are analyzed for whether the present driving situation corresponds to a certain condition, so that there is an option for a lane release. In particular, it is checked whether in the present driving situation there is the possible option at all for carrying out a specific driving maneuver, in particular a lane change. For example, it is checked whether another lane to the right of the present lane is even present at all. It may also be checked whether the speed of the ego-vehicle is not excessive. A lane change entails a higher risk at excessive speeds. It may therefore be provided, for example, that an automated lane release no longer takes place above a settable speed threshold.

In one alternative embodiment of the present invention, the method is characterized by the method steps: ascertaining a lane release situation; deciding to release the first lane by the motor vehicle, taking the lane release situation into account.

This is understood to mean that the lane release situation as such is recognized when it corresponds to a defined characteristic. This is the case, for example, when the motor vehicle is in a specific driving situation in which the motor vehicle should release its lane, for example according to rules (or conditions) stored in the vehicle. As such rules, it may be advantageously be defined that a change of the ego-vehicle into a second lane must be possible. For example, a lane that tends to be slower may be regarded as a second lane. A change into this lane is possible only when this lane is not already occupied directly (or also at a fairly short distance away) by a further vehicle. It may generally also be defined that a change of the following motor vehicle, i.e., the blocked motor vehicle, into an alternative lane is not possible. For example, a lane that tends to be faster may be regarded as an alternative lane. A change of the blocked motor vehicle into such an alternative lane may not be possible, for example, if in principle no such alternative lane is present, or such a lane is occupied by a further vehicle. It may generally also be defined that a possible change of the ego-motor vehicle into the second lane actually also eliminates the obstacle of the following motor vehicle. For example, if a further, possibly even slower, vehicle is situated directly ahead of the ego-motor vehicle, a lane release by the ego-motor vehicle would not result in an improvement of the driving situation for the blocked following vehicle. Consequently, a lane release by the ego-vehicle does not seem productive, and therefore is not necessary.

In one advantageous refinement of the present invention, the method is characterized in that a data signal is generated, with the aid of which an operator of the motor vehicle may be informed of the decided lane return into the first lane.

This is understood to mean that technical preparations are made in order to inform the driver of the imminent lane release. For this purpose, data signals are correspondingly encoded and provided. With the aid of the data signals, output devices may be activated which provide the driver with appropriate information. The information may be communicated to the driver visually, for example with the aid of a display, or for example acoustically with the aid of speech output. Of course, haptic information such as seat vibrations is possible. The driver is advantageously informed of the planned automated lane change by a corresponding setting of the blinker. Due to the timely information concerning the planned driving maneuver, the driver advantageously obtains the option of preventing an automated execution if this is desired.

In one possible specific embodiment of the present invention, the method includes that a data signal is generated, with the aid of which the surroundings of the motor vehicle may be informed of the decided or planned lane return into the first lane. The further road users, for example following vehicles in the first lane, are advantageously informed of the planned automated lane change via an appropriate setting of the blinker.

In one preferred embodiment of the present invention, the method includes that carrying out the decided lane return into the first lane with the aid of an automated lane change takes place when no rejection of the decided lane return by an operator of the motor vehicle is ascertained, in particular when, within a defined time period after the driver is informed of the decided lane return into the first lane, no rejection of the decided lane return by the operator of the motor vehicle is ascertained.

This is understood to mean that an automated lane return into the first lane takes place only when no rejection of the lane change by an operator (in particular a driver) of the motor vehicle is ascertained. A rejection of the lane change by the vehicle operator may take place in advance of carrying out the lane change. For example, immediately after being informed of the intended lane return, the driver may prevent a start of the driving maneuver via a command input, for example by switching off the set blinker. Of course, a rejection of the lane change may also take place while carrying out the lane change (i.e., an abortion of the started lane return operation), for example by taking over the steering wheel and steering back into the second lane.

If no negative input of the vehicle operator, or no contrary intent of the vehicle operator, is ascertained, the automated lane return may advantageously still take place. Thus, no positive confirmation by the driver is necessary for carrying out the automated lane return. Automatedly carrying out the lane return also takes place, for example, when no response by the driver takes place.

The method according to the present invention may be implemented, for example, in software or hardware or in a mixed form made up of software and hardware, for example in a control unit. The present invention also provides a device that is designed to carry out, control, or implement the steps of one variant of a method provided here in appropriate units. By use of this embodiment variant of the present invention in the form of a device, the object underlying the present invention may also be achieved quickly and efficiently.

In the present context, a device may be understood to mean an electrical, electronic, or electromechanical device that processes sensor signals and outputs control signals and/or data signals as a function thereof. The device may include an interface that may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules that are present, for example, on a microcontroller in addition to other software modules. A device may therefore encompass a motor vehicle, a driver assistance system for automated lateral guidance and/or transverse guidance for a motor vehicle, a surroundings detection device, in particular a camera, LIDAR, and/or radar, an actuator system, in particular an actuator system for automated transverse control and/or longitudinal control, or a centralized or decentralized control unit for implementing one of the stated devices.

Also advantageous is a computer program product or computer program including program code that may be stored on a machine-readable medium or memory medium such as a semiconductor memory, a hard disk, or an optical memory, and used for carrying out, implementing, and/or controlling the steps of the method according to one of the specific embodiments of the present invention described above, in particular when the program product or program is executed on a computer or a device.

BRIEF DESCRIPTION OF THE DRAWINGS

It is to be noted that the features stated individually in the description may be combined with one another in any technically meaningful manner, and represent further embodiments of the present invention. Further features and advantages of the present invention result from the description of exemplary embodiments with reference to the figures.

DETAILED DESCRIPTION OF EXAMPLE EMBODIMENTS

FIG. 1A-1D show a schematic illustration of a sequence of one example embodiment of the method of the present invention in a specific traffic situation, depicted in multiple sequences.

Figure 1A:
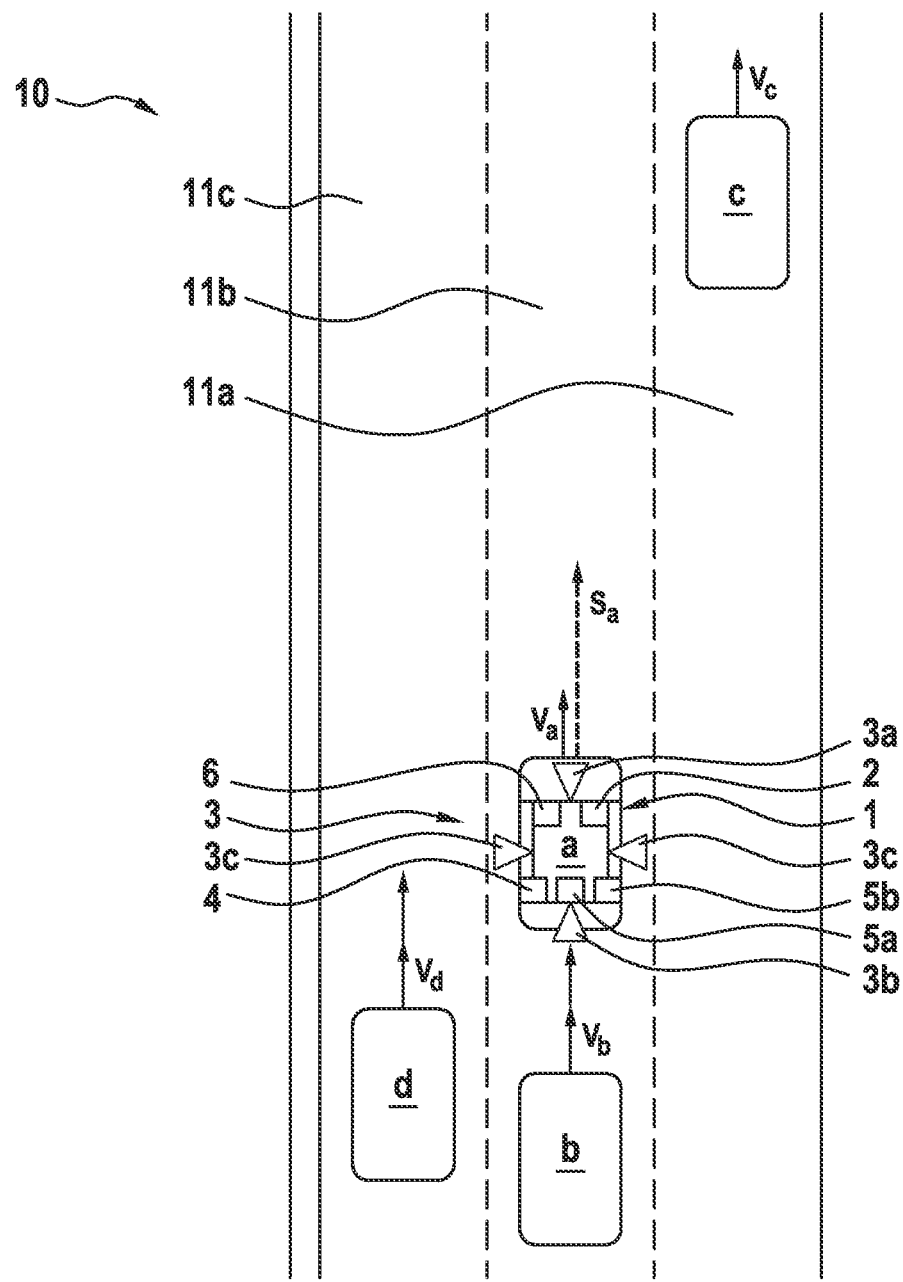
FIGS. 1A through 1D show a schematic illustration of a sequence of one embodiment of the method in a specific traffic situation.

FIG. 1A shows the starting situation. A motor vehicle 1 (also referred to as ego-vehicle a) on a roadway 10 is illustrated. Roadway 10 includes three lanes: right lane 11a (also referred to as the second lane), middle lane 11b (also referred to as the first lane), and left lane 11c.

Motor vehicle 1 includes a driving assistance system 2, which is designed as a driving assistant for automated lane guidance. A sensor system 3 for surroundings detection is also illustrated. This sensor system includes a sensor 3a for front surroundings detection (a front camera, for example), a sensor 3b for rear surroundings detection (a rear camera, for example), and multiple sensors 3c for lateral surroundings detection (side cameras, for example). Of course, radar, LIDAR, or other suitable types of sensors may alternatively or additionally be used. Motor vehicle 1 also includes a processing unit 4 (also referred to as a control unit) for evaluating the sensor data and/or for carrying out the method and/or for activating the actuators. Motor vehicle 1 also includes an actuator system 5, which is made up, for example, of an actuator 5a for transverse control and an actuator 5b for longitudinal control. Furthermore, a device 6 for informing the driver is provided. This device may convey information to the driver, for example in a visual and/or acoustic and/or haptic manner.

In the illustration, motor vehicle 1 is moving on travel trajectory $s_a$ at speed $V_a$. In the illustrated traffic situation, further road users are situated on roadway 10 in addition to motor vehicle 1: a vehicle b with a greater driving speed $V_b$ is situated behind ego-vehicle a in the same middle lane 11b. A vehicle c with a speed $V_c$ that is slightly less than speed $V_a$ of ego-vehicle a is situated ahead of ego-vehicle a, in right lane 11a in the travel direction. A further vehicle d is situated in left lane 11c, approximately at the level of vehicle b. Vehicle d is traveling at speed $V_d$, which is similar to $V_b$ and greater than $V_a$.

Figure 1B:
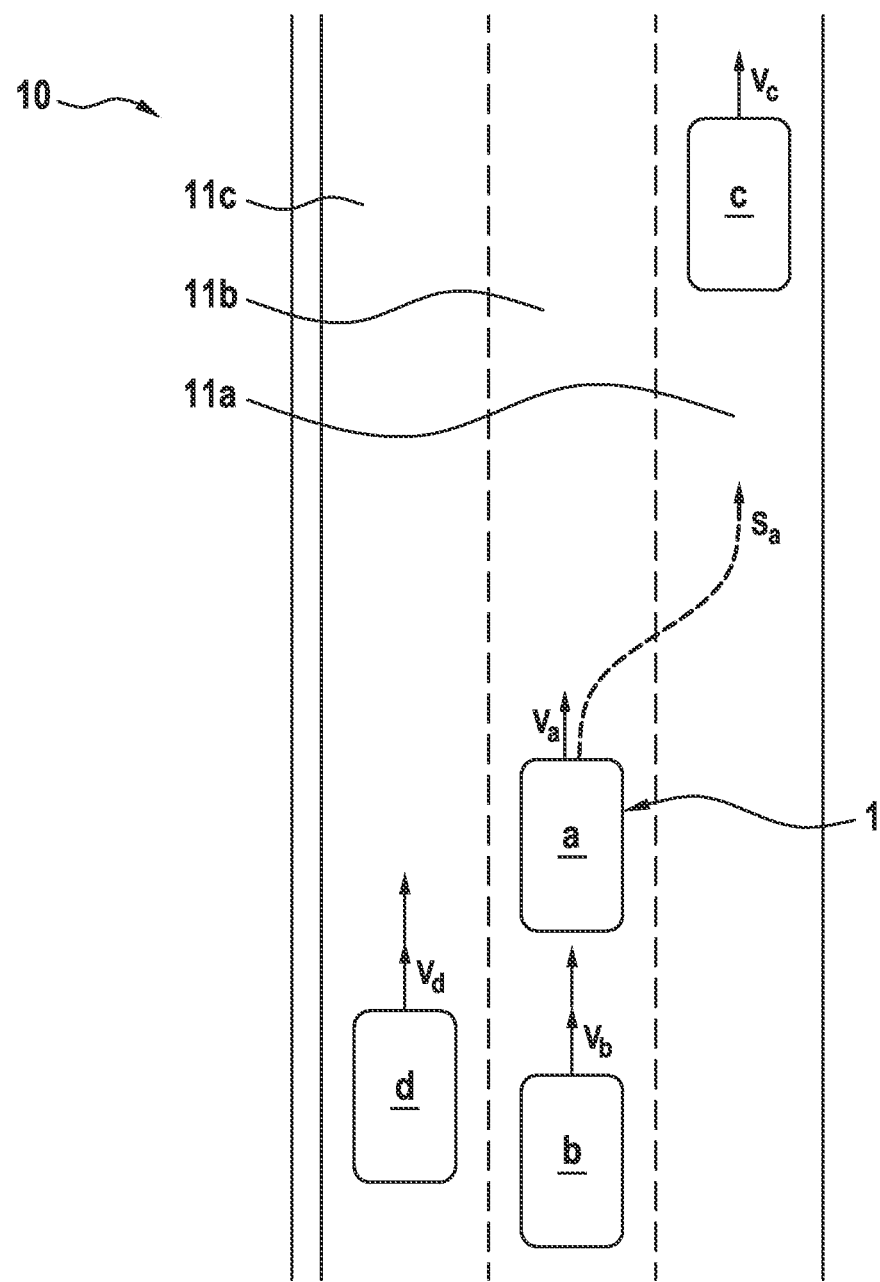

FIG. 1B shows an intermediate situation. Ego-vehicle a has ascertained the obstacle situation which it has created, and a decision for the automated lane release is made. The traffic situation behind ego-vehicle a (in particular, the distance and acceleration difference between ego-vehicle a and vehicle b) has been taken into account, and the traffic situation ahead of ego-vehicle a (in particular the distance and acceleration difference between ego-vehicle a and vehicle c) has been analyzed. It has been ascertained that a lane change is possible, and a lane release according to preset criteria appears to be appropriate. In addition, it has been ascertained that a subsequent lane return from the right to the middle lane appears to be possible without the movement option of ego-vehicle a being restricted by preceding vehicle b, for example having to carry out a brake application or reduce the present driving speed. An option for a lane return is thus also recognized. An automated lane change to the right lane is thus initiated. Travel trajectory $s_a$ already shows the planned lane change of ego-vehicle a from lane 11b to lane 11a.

Figure 1C:
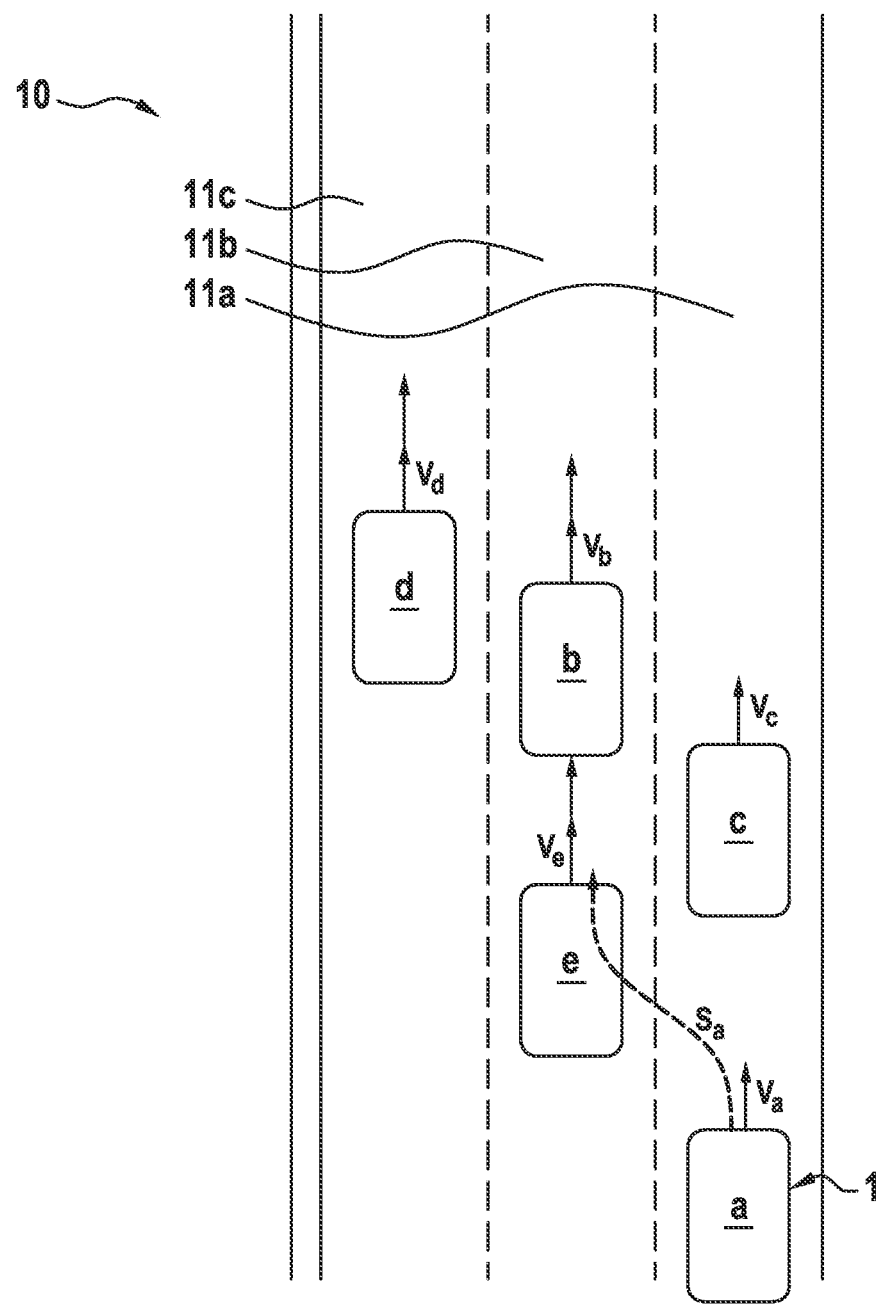

FIG. 1C shows the next intermediate situation. Ego-vehicle a has carried out the automated lane change into second lane 11a, and now carries out an automatic lane guidance there in second lane 11a. At the same time, ego-vehicle a monitors the traffic situation in order to recognize a lane return situation. Since a further vehicle e is traveling directly behind vehicle b in the same lane, ego-vehicle a must allow both vehicles b and e to pass. Since no further vehicle is ascertained behind vehicle e in first lane 11b, a positive lane return situation is recognized as soon as vehicle e has reached the level of ego-vehicle a. Ascertained travel trajectory $s_a$ shows the subsequently planned lane return of ego-vehicle a from second lane 11*a* back to first lane 11*b*.

Figure 1D:
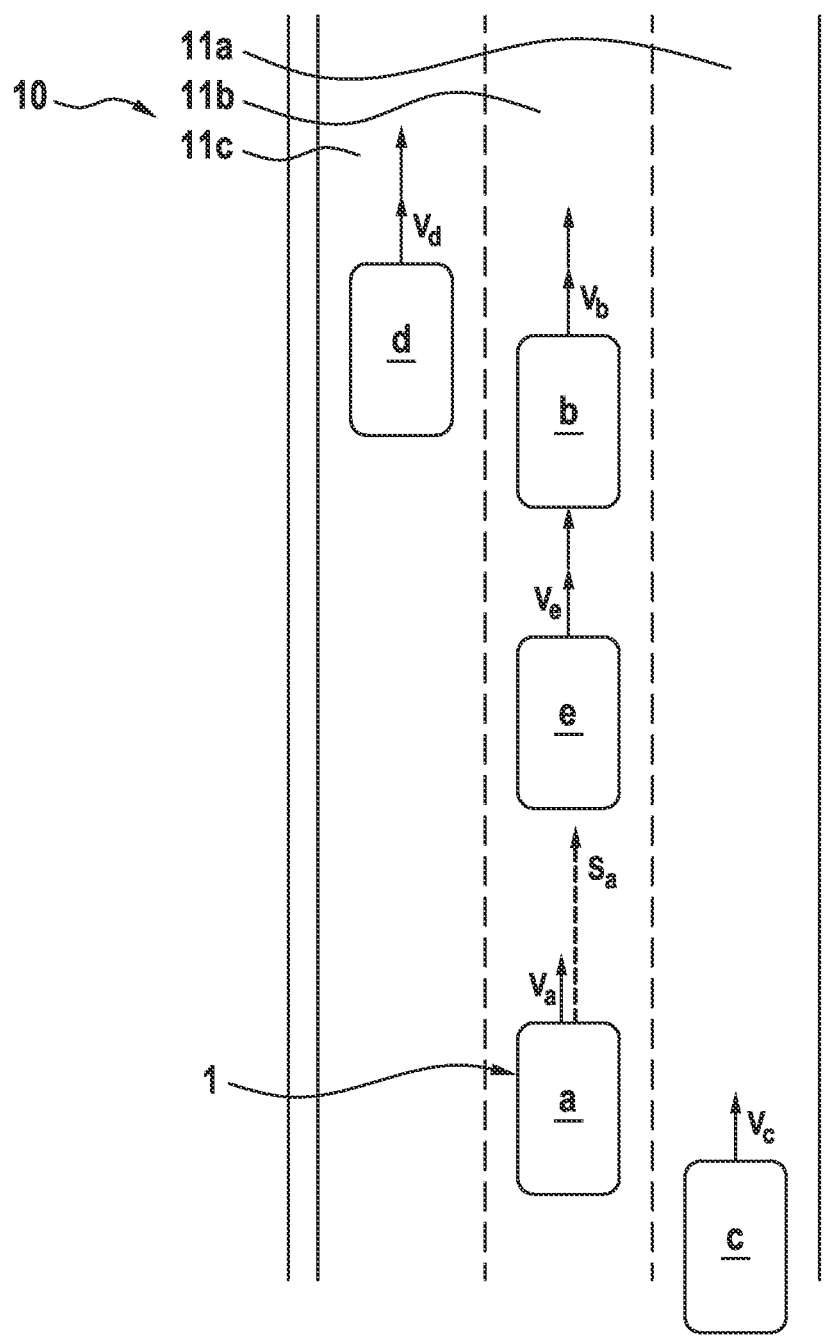

FIG. 1D shows the end situation. Ego-vehicle a has carried out the automated lane return into first lane 11*b*, and now continues to carry out the automated lane guidance in first lane 11*b*. Travel trajectory $s_a$ correspondingly points straight ahead.

Figure 2:
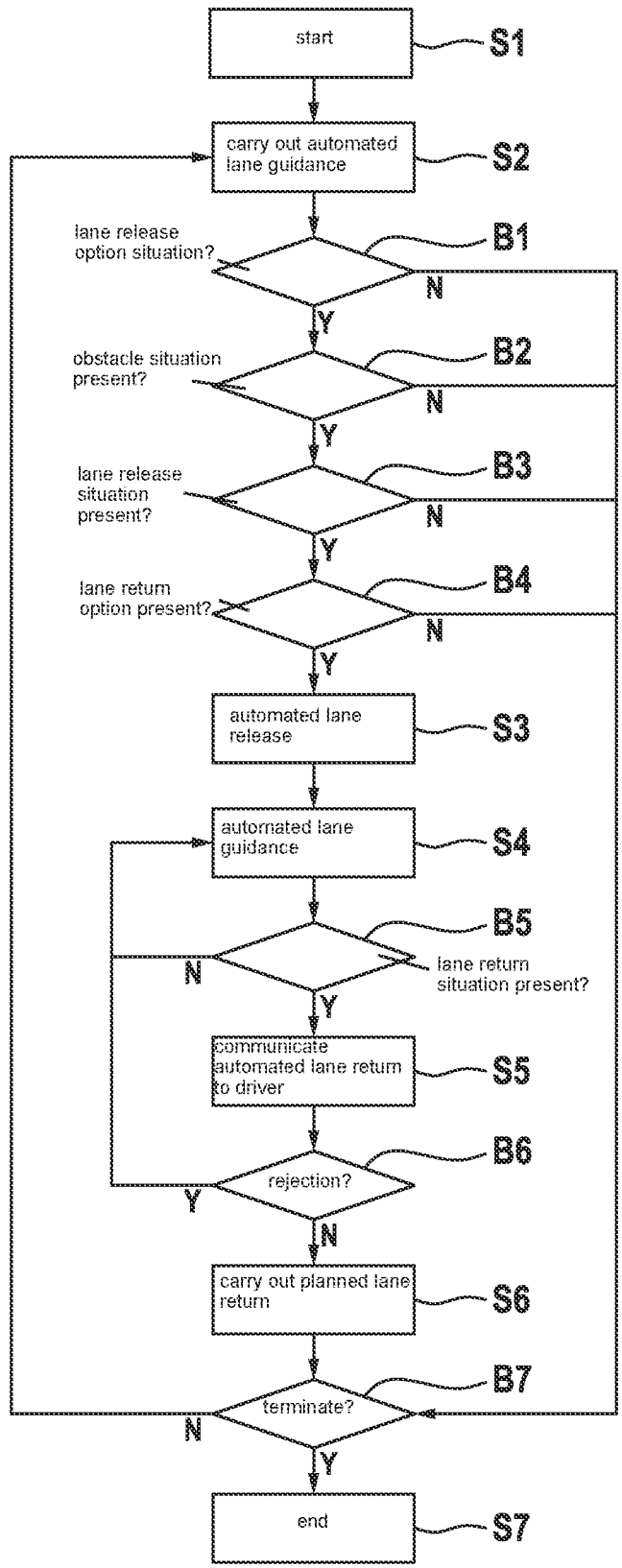
FIG. 2 shows an illustration of the method steps of one specific embodiment of the present invention.

FIG. 2 shows an illustration of the method steps of one specific embodiment of the present invention. The method starts in a first step S1. The automated lane guidance of ego-vehicle a in the first lane is carried out in a step S2. For example, the automated lane guidance is activated by the driver of the motor vehicle.

In a condition B1 it is then checked whether a lane release option situation (generally also referred as a driving option situation) is present, or whether a lane release option situation corresponds to a defined characteristic.

For example, for this purpose surroundings data are ascertained, and are analyzed for whether the present driving situation corresponds to a certain condition, so that an option for a lane release exists. In particular, it is checked whether in the present driving situation there is the possible option at all for carrying out a specific driving maneuver, in particular a lane change. For example, it is checked whether another lane to the right of the present lane is even present at all.

If the lane release option situation corresponds to a defined characteristic (Y branch), i.e., a lane release is possible in principle, in a further condition B2 it is checked whether an obstacle situation is present, or whether an obstacle situation corresponds to a defined characteristic.

For example, the traffic situation to the rear is monitored. In particular, the traffic situation directly behind the ego-vehicle is taken into account. It is checked, for example, whether a vehicle is traveling behind the ego-vehicle in the same lane. In a first embodiment, a lane release may take place as needed when a further vehicle is recognized within a defined distance behind the ego-vehicle. Alternatively or additionally, the speed or the speed difference between the two vehicles may be taken into account. In addition, the acceleration and/or acceleration differences between this vehicle and the ego-vehicle may be ascertained. It may thus be ascertained whether the ego-vehicle would represent an obstacle for an extrapolated continued travel of the vehicle that is closing in.

In addition, it is possible for the driver to have a setting option, for example to change the sensitivity of the lane release. It is thus possible for the driver, with the aid of the setting, to be able to influence the trigger thresholds, in particular the distance between the ego-vehicle and the following vehicle and/or their relative speeds in order to configure carrying out the function, in particular to configure a temporary release of the present lane with the aid of a lane change, for its requirements.

For the method, the surroundings of the vehicle are monitored with the aid of a sensor system. In particular a front camera and/or a rear sensor (for example, rear radar, rear camera, or rear LIDAR), and/or a surroundings sensor (for example, a 360° video system, corner radar) may be used. The ascertainment of the data with the aid of the sensor system may take place as a separate step within the scope of the method. It is subsequently evaluated, with the aid of a control unit, whether a lane release is necessary and possible. For example, the control unit may be a central computer control unit or a control unit of the sensor system or of an actuator, or the functionalities may be additionally implemented on such a control unit.

If the obstacle situation corresponds to a defined characteristic (Y branch), i.e., a defined obstacle is actually present, it is checked in a further condition B3 whether a lane release situation is present, or whether a lane release situation corresponds to a defined characteristic.

In one embodiment, the system may monitor the general traffic situation and carry out a situation-adaptive lane release. This means that only in defined traffic situations is a lane release decision ascertained and automatedly implemented if necessary. In particular, an ascertainment of a lane release decision takes place when another road user would be hindered by maintaining the present lane, and a lane release by the ego-vehicle may be carried out without significant losses in driving comfort and driving safety, and without a significant effect on the efficiency.

It is also possible that a driver setting with regard to the strictness of the determination criteria may be made. For a corresponding changed setting, release decisions would be output more frequently or less frequently.

If the lane release situation corresponds to a defined characteristic (Y branch), i.e., in the present situation a lane release should be carried out, taking the ascertained criteria into account, it is checked in a condition B4 whether a lane return option situation is present, or whether a lane return option situation corresponds to a defined characteristic.

For example, for this purpose surroundings data are ascertained, and are analyzed for whether the present driving situation corresponds to a certain condition, so that there is an option for a lane return. In particular, it is checked whether there is a certain likelihood in the present driving situation for the option to carry out a real-time lane return.

In particular, an ascertainment of a positive lane change decision to travel from the present lane into a target lane of the lane change takes place when a lane return of the ego-vehicle from the target lane of the lane change (for example, the right lane of a three-lane roadway) back into the present lane (for example, the middle lane of a three-lane roadway) appears to be possible, in particular appears to be possible within a defined distance.

In this context, it is not an actual lane return that is to be immediately carried out that is analyzed, but, rather, the option for or the likelihood of a later lane return, in particular a lane return after resolving the obstacle situation in the first lane.

If the lane return option situation corresponds to a defined characteristic (Y branch), i.e., in the present situation a lane return appears to be possible, taking the ascertained criteria into account, a decision for the automated lane release is made and carried out in a next step S3.

This is followed by carrying out the automated lane guidance of the ego-vehicle in the second lane in a step S4.

While the automated lane guidance is being carried out in step S4, in a further condition B5 it is checked whether a lane return situation is present, or whether a lane return situation corresponds to a defined characteristic.

In one embodiment, the system may monitor the general traffic situation and carry out a situation-adaptive lane return. This means that only in defined traffic situations is a lane return recommendation ascertained and automatedly carried out.

In particular, an ascertainment of a lane return decision takes place when it is ascertained that, if a lane return from the present lane (for example, the right lane of a three-lane roadway) back into the target lane of the lane return (for example, the middle lane of a three-lane roadway) would be made, the ego-vehicle would not hinder any motor vehicles in this target lane of the lane return.

In this context, an actual lane return to be carried out at that time is analyzed.

In a first embodiment, a lane return may take place when no further motor vehicle is recognized behind the ego-vehicle in the target lane of the lane return. Similarly, a lane return may take place when, although a further motor vehicle is recognized in the target lane of the lane return, the distance between the two vehicles is greater than a defined threshold value.

As an alternative or in addition to the distance, the speed or the speed difference between the two vehicles may be taken into account. In addition, the acceleration and/or acceleration differences between this vehicle and the ego-vehicle may be ascertained. It may thus be ascertained, for a potential lane return, whether the ego-vehicle would represent an obstacle during extrapolated further travel of the vehicle that is closing in.

In addition, it is possible for the driver to have a setting option, for example to change the sensitivity of the lane return. It is thus possible for the driver, with the aid of the setting, to be able to influence the trigger thresholds, in particular the distance between the ego-vehicle and the following vehicle and/or their relative speeds in order to configure the execution of the driving function for its requirements.

If the lane return situation corresponds to a defined characteristic (Y branch), i.e., in the present situation a lane return appears to be possible, taking the ascertained criteria into account, the information concerning the decided, i.e., imminent, automated lane return is communicated to the driver in a next step S5.

This means that with the aid of a communication device, the imminent interruption of the lane guidance function in the present lane and/or the planned driving maneuver are/is communicated to the driver. For example, an acoustic and/or haptic and/or visual output or physical contact (such as vibration) to the driver may take place. In addition, an automated setting of the blinker in the planned lane change direction may be used.

The driver may also be provided with the option of preventing the planned driving maneuver, and instead, continuing to carry out the present automated lane guidance function. According to the information to the driver, it is checked in a condition B6 whether a rejection of the planned automated lane change by the driver is recognized. For example, an acoustic objection by the driver may be ascertained. A deactivation of the set blinker may also be regarded as a rejection. Condition B6 may be associated, for example, with a temporal threshold, so that, for example, it is awaited for a defined time whether a negative response of the driver is ascertained. For example, 2 to 5 seconds may be defined as a defined time. If no response, or at least no negative response, of the driver is ascertained, it may be assumed that no rejection of the driver concerning the planned automated lane change is present.

If no rejection of the planned automated lane return is ascertained, in a step S6 the planned lane return is automatedly carried out and the motor vehicle changes from the second lane into the first lane. If no termination of the method is recognized, it is then checked in a subsequent condition B7 whether a termination of the method is present. If this is the case (Y branch), the method is thus ended with step S7. If this is not the case (N branch), a further execution of the automated lane guidance of the ego-vehicle in the first lane takes place with step S2.

What is claimed is:

1. A method for operating a driving assistant for lateral guidance of an ego motor vehicle, the method comprising the following steps:
   carrying out an automated lane guidance of the ego motor vehicle in a first lane;
   ascertaining, by the ego motor vehicle, that the ego motor vehicle is in a scenario in which the ego motor vehicle is, due to a speed difference between respective speeds of the ego vehicle and a further motor vehicle that is (i) behind the ego motor vehicle and (ii) in the first lane, presently at risk of becoming an obstacle to the further motor vehicle;
   in response to the ascertainment:
      ascertaining whether the risk exceeds a threshold value that is dependent on a presently selected sensitivity level;
      ascertaining whether there is presence of at least one determined later option of returning from a second lane to the first lane that would be available if a potential lane release would be performed; and
      carrying out the lane release, which is an automated lane change of the ego motor vehicle from the first lane into the second lane, wherein the performance of the carrying out of the lane release is made conditional upon that both (i) the threshold value is exceeded and (ii) the later option of the returning to the first lane has been ascertained to be present;
   subsequent to the lane release, carrying out a decided lane return from the second lane, in which the ego motor vehicle is located due to the carrying out of the lane release, back into the first lane using a further automated lane change, the decided lane return being selected from the at least one determined later option; and
   continuing the automated lane guidance of the ego motor vehicle in the first lane in which the ego motor vehicle is located due to the decided lane return.

2. The method as recited in claim 1, wherein a data signal is generated using which an operator of the ego motor vehicle may be informed of the decided lane return into the first lane.

3. The method as recited in claim 1, wherein a data signal is generated using which surroundings of the ego motor vehicle may be informed of the decided lane return into the first lane.

4. The method as recited in claim 1, wherein the at least one determined later option is ascertained to be present conditional upon at least one of the following conditions:
   a lane return of the ego motor vehicle from the second lane back into the first lane is possible within a defined distance; and
   a change of the ego motor vehicle into the second lane does not result in a restriction of a movement option of the ego motor vehicle within a defined distance.

5. The method as recited in claim 1, wherein the decided lane return into the first lane using further automated lane change takes place when no rejection of the decided lane return by an operator of the ego motor vehicle is ascertained.

6. The method as recited in claim 5, wherein the decided lane return into the first lane using the automated lane change takes place when, within a defined time period after a driver is informed of the decided lane return into the first lane, no rejection of the decided lane return by the operator of the ego motor vehicle is ascertained.

7. The method as recited in claim 1, wherein the at least one determined later option is ascertained to be present when at least one of the following conditions is met:
- a non-obstacle situation of a further motor vehicle in the first lane is ascertained by the ego motor vehicle for a potential lane return of the ego motor vehicle into the first lane;
- a traffic gap in the first lane that is sufficient for a potential lane return of the ego motor vehicle is ascertained; and
- a restriction of a movement option of the ego motor vehicle in the second lane is ascertained.

8. The method as recited in claim 7, wherein the non-obstacle situation of a further motor vehicle in the first lane is ascertained by the ego motor vehicle for a potential lane return of the ego motor vehicle into the first lane when at least a condition is met that a distance between the ego motor vehicle in the second lane and a following motor vehicle in the first lane is greater than a defined threshold value.

9. The method as recited in claim 7, wherein the non-obstacle situation of the further motor vehicle in the first lane is ascertained by the ego motor vehicle for the potential lane return of the ego motor vehicle into the first lane when at least a condition is met that in a rear field of the motor vehicle in the second lane, no further motor vehicle is ascertained in the first lane.

10. The method as recited in claim 7, wherein the non-obstacle situation of the further motor vehicle in the first lane is ascertained by the ego motor vehicle for the potential lane return of the ego motor vehicle into the first lane when at least a condition is met that a speed difference between the ego motor vehicle in the second lane and a following motor vehicle in the first lane is less than a defined threshold value.

11. The method as recited in claim 7, wherein the non-obstacle situation of the further motor vehicle in the first lane is ascertained by the ego motor vehicle for the potential lane return of the ego motor vehicle into the first lane when at least a condition is met that an acceleration difference between the ego motor vehicle in the second lane and a following motor vehicle in the first lane is less than a defined threshold value.

12. A device configured to operate a driving assistant for lateral guidance of an ego motor vehicle, the device configured to:
- carry out an automated lane guidance of the ego motor vehicle in a first lane;
- ascertain, by the ego motor vehicle, that the ego motor vehicle is in a scenario in which the ego motor vehicle is, due to a speed difference between respective speeds of the ego vehicle and a further motor vehicle that is (i) behind the ego motor vehicle and (ii) in the first lane, presently at risk of becoming an obstacle to the further motor vehicle;
- in response to the ascertainment:
  - ascertain whether the risk exceeds a threshold value that is dependent on a presently selected sensitivity level;
  - ascertain whether there is presence of at least one determined later option of returning from a second lane to the first lane that would be available if a potential lane release would be performed; and
  - carry out the lane release, which is an automated lane change of the ego motor vehicle from the first lane into the second lane, wherein the performance of the carrying out of the lane release is made conditional upon that both (i) the threshold value is exceeded and (ii) the later option of the returning to the first lane has been ascertained to be present;
- subsequent to the lane release, carry out a decided lane return from the second lane, in which the ego motor vehicle is located due to the carrying out of the lane release, back into the first lane using a further automated lane change, the decided lane return being selected from the at least one determined later option; and
- continue the automated lane guidance of the ego motor vehicle in the first lane in which the ego motor vehicle is located due to the decided lane return.

13. A non-transitory machine-readable medium on which is stored a computer program for operating a driving assistant for lateral guidance of an ego motor vehicle, the computer program, when executed by a processor, causing the processor to perform the following steps:
- carrying out an automated lane guidance of the ego motor vehicle in a first lane;
- ascertaining, by the ego motor vehicle, that the ego motor vehicle is in a scenario in which the ego motor vehicle is, due to a speed difference between respective speeds of the ego vehicle and a further motor vehicle that is (i) behind the ego motor vehicle and (ii) in the first lane, presently at risk of becoming an obstacle to the further motor vehicle;
- in response to the ascertainment:
  - ascertaining whether the risk exceeds a threshold value that is dependent on a presently selected sensitivity level;
  - ascertaining whether there is presence of at least one determined later option of returning from a second lane to the first lane that would be available if a potential lane release would be performed; and
  - carrying out the lane release, which is an automated lane change of the ego motor vehicle from the first lane into the second lane, wherein the performance of the carrying out of the lane release is made conditional upon that both (i) the threshold value is exceeded and (ii) the later option of the returning to the first lane has been ascertained to be present;
- subsequent to the lane release, carrying out a decided lane return from the second lane, in which the ego motor vehicle is located due to the carrying out of the lane release, back into the first lane using a further automated lane change, the decided lane return being selected from the at least one determined later option; and
- continuing the automated lane guidance of the ego motor vehicle in the first lane in which the ego motor vehicle is located due to the decided lane return.

* * * * *